July 27, 1954  H. A. GREISER  2,684,559
COLLAPSIBLE VALVE FOR SANDBLAST HOSE
Filed Dec. 4, 1950
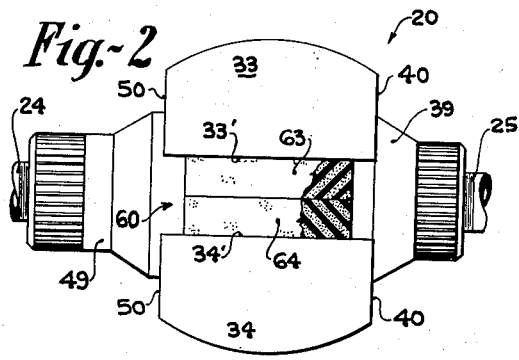
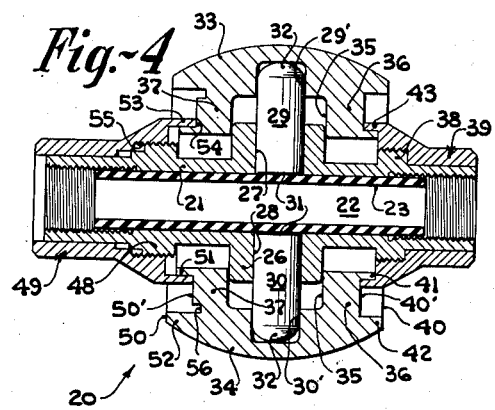
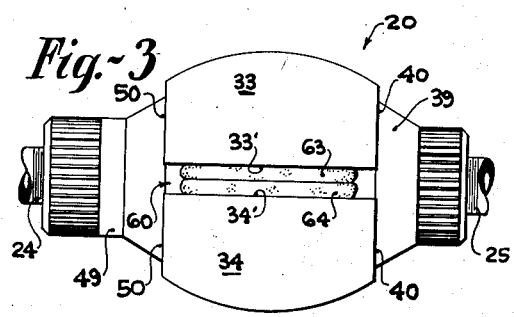
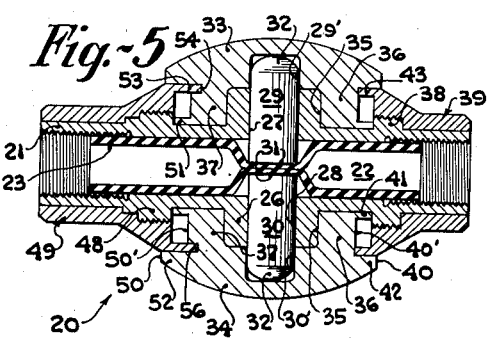
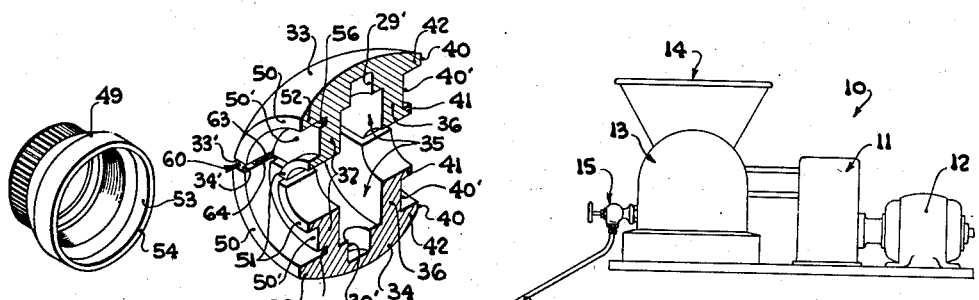
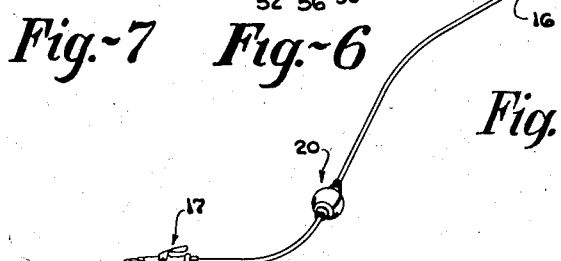
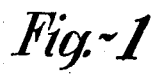
INVENTOR:
Howard A. Greiser
BY
Leslie M. Hansen
HIS ATTORNEY.

Patented July 27, 1954

2,684,559

UNITED STATES PATENT OFFICE 2,684,559

COLLAPSIBLE VALVE FOR SANDBLAST HOSE

Howard A. Greiser, San Jose, Calif.

Application December 4, 1950, Serial No. 199,099

9 Claims. (Cl. 51—12)

This invention relates to valves and particularly to an improved valve for use in a compressed air line. More specifically the invention herein is directed to a novel hand operated control valve for a sandblast hose.

The device of the present invention is especially adapted for use in conjunction with a flexible hose by which sand is conveyed with compressed air from a compressor. Broadly the purpose of the present device is to provide a means for controlling, limiting or cutting off the flow of sand and air through the hose at a point adjacent the nozzle and remote from the compressor.

It is one object of this invention to provide a valve of the above mentioned class which is simple in construction, economical in manufacture, and highly efficient in use.

Another object is to provide a simple hand control valve for an air line as close to the nozzle as possible to enable the sandblast artist to vary the pressure and flow of grit and air from the hose.

Another object is to provide a novel sandblast control valve which fits in the palm of a person's hand for gripping action thereby to regulate the flow of sand-air mixture to the nozzle manipulated by the other hand of said person.

Yet another object is to provide for a control valve, a ball-like grip in which half sphere elements movable toward and from each other effect the flow of material through such valve.

Still another object is to provide in a control valve a novel means for limiting outward movement of the gripping elements and for locking said gripping elements in their extreme inward position.

These and other objects and advantages will become apparent from a reading of the following description in connection with the drawings in which:

Fig. 1 is a perspective illustration of a mechanism including a valve employing the present invention.

Fig. 2 is an enlarged side view of the valve shown in Fig. 1.

Fig. 3 is a view similar to Fig. 2 with parts thereof in a different position.

Fig. 4 is a longitudinal section through Fig. 2.

Fig. 5 is a longitudinal section through Fig. 3.

Fig. 6 is a perspective view of a portion of the parts shown in Figs. 4 and 5.

Fig. 7 is a perspective view of a part illustrated in Figs. 2 through 4.

A simple form of sandblasting equipment 10 is illustrated in Fig. 1 of the drawings. Such equipment comprises a compressor 11 driven by a motor 12 for building up air pressure within a chamber 13 for discharge via an outlet, not shown, communicating with a supply of sand in a hopper 14. Thus a sand-air mixture is forced out through a main control valve 15 for movement through a hose line 16 toward a nozzle 17. Since the equipment 10 is usually stationary, as distinguished from portable, the hose 16 thereof is generally of considerable length to enable the sandblast artist at the nozzle 17 to move about and to work over a large area at considerable distance from the compressor. In other words, the man at the nozzle generally has to rely on someone else shutting off the main control valve 15 at the compressor or he has to walk back to the compressor himself in order to turn off the main valve. It is in this connection that a valve 20 embodying the present invention is most useful in that it is placed in the hose line 16 adjacent the nozzle 17, i. e., at a point remote from the compressor, as seen in Fig. 1. In this manner the sandblast artist himself can shut off the flow of material through the hose line.

Referring now to Figs. 2 through 7 the valve 20 comprises a tubular barrel 21 forming a housing for a section of latex hose 22 having an internal passage 23 comparable to that within the hose line 16. In this connection it is conceivable that the barrel 21 could be slidably mounted right on the hose 16 but since high compression hose is relatively stiff and tough a latex insert such as the one 22 is more practical and efficient. That is to say, even though the latex hose 22 is very resilient and susceptible to expansion under pressure, since it is completely embraced by the barrel 21 there is no likelihood of its bursting. Moreover, a pure latex insert can withstand the cutting effect of the swiftly moving particles of sand more readily than a stiff rubber hose like the line 16. The latex insert can also be replaced with less difficulty and expense than could a complete hose line.

The barrel 21 has internal threading at both its ends for receiving a threaded fitting 24 and 25, respectively, secured to the connecting ends of the hose line 16. In this manner the section 22 of latex hose can be communicated with the hose line 16 in a well known manner.

Between its threaded ends the barrel 21 is provided with an annular flange 26 having formed therein diametrically opposed cylindrical guide passages 27 and 28. These passages 27—28 are preferably of a diameter slightly greater than the internal diameter of the latex section 22 and each supports a pin 29 and 30, respectively, for sliding movement toward and from the latex hose 22. The inner ends of these pins 29—30 have cooperating flat surfaces 31 adapted, when forced toward each other, to flatten or pinch the latex hose 22 in the manner shown in Fig. 5.

The outer ends 32 of the pins 29—30 seat in annular sockets 29'—30' formed in shiftable actuating members 33 and 34, respectively. If the surfaces 31 on the inner ends of the pins 29—30 are disposed other than transverse to the axes of the pins, i. e., angularly disposed, the upper ends 32 of the pins can be keyed relative to the sockets 29'—30' to prevent turning of the pins so as to maintain the surfaces parallel to each other.

Each shiftable actuating member 33 and 34 is preferably of hemispherical shape so that when combined they form a ball adapted to fit the palm of a human hand for gripping thereby. These half ball members 33—34 each have a centrally disposed inner recess 35 adapted to slip-fit over the annular flange 26, and semicircular surfaces 36 and 37 on either side and coaxially of the recess 35 adapted to seat against the outer periphery of the barrel 21. Each hemispherical member 33—34 is cut off chordally equidistant from the axes of the pins 29—30 to present flat faces on the members 33—34 circumscribing the extended ends of the barrel 21.

One end of the barrel 21 (right hand end Figs. 4 and 5) has an enlarged annular flange 38 provided with outside threading to receive a retaining nut 39 adjacent the chordal face 40 of the hemispherical members 33—34. This face 40 is cut inwardly as at 40' to provide an inside flange 41 adjacent the semicircular surface 36 and an outside flange 42 adjacent the spherical periphery of the combined half ball members 33—34. The other end of the barrel 21 (left hand Figs. 4 and 5) is similarly provided with an enlarged annular flange 48 provided with outside threading to receive a retaining and/or locking nut 49 adjacent the chordal face 50 of the hemispherical members 33—34. This face 50 is cut inwardly as at 50' to provide an inside flange 51 adjacent the semicircular surface 37 and an outside flange 52 adjacent the spherical periphery of the combined half ball members 33—34.

Each hemispherical member 33—34 is normally urged outwardly or away from each other due to the inherent resiliency of the latex insert 22 acting upon the pins 29—30. The retaining nut 39 has an annular flange 43 parallel to flanges 41 and 42 and coacting with the latter to limit inward or outward movement of the members 33—34. The retaining nut 49 also has an annular flange 53 coacting with its associated flanges 51 and 52 on the members 33—34 to limit movement thereof toward and from each other. However, such freedom of movement of the members 33—34 is possible only when the face 54 of the flange 53 lies adjacent the plane of the inwardly cut face 50' as seen in Fig. 4.

In connection with the foregoing it will be noted that the internal threading 55 on the nut 49 is such as to allow threaded movement of the nut 49 toward the half members 33—34 sufficiently to cause the face 54 on flange 53 to extend inwardly beyond the cut in face 50' of the half members. However, this is possible only when the two halves 33—34 are pressed together into their extreme inward position and to this end the face 50' is cut deeper adjacent the outside flange 52 to provide an annular keeper groove 56 for receiving the flange 53 of the nut 49.

It will thus be seen in Fig. 5 that upon threading the locking nut 49 all the way onto the annular flange 48 of the barrel 21, the annular flange 53 extends into the keeper groove 56 to hold the two halves 33—34 together. Note also that the two halves 33—34 are guided for radial movement upon the annular flange 26 on the barrel. Moreover, the inner face of the flange 43 on retaining nut 39 forms a guide for the cut in surface 40' on the halves 33—34. Consequently, there is no likelihood of the two halves becoming misaligned with respect to each other.

As a result of the foregoing disposition of the half ball members in locked position by the annular flange 53 of the locking unit 49, the diametrically opposed pins 29—30 are forced together. Thus the latex hose 22 is collapsed, its opposite sides firmly engaging each other to block the passage formed by the latex tube 22.

As best seen in Figs. 2 and 3 each of the ball half members 33—34 have their adjacent surfaces 33'—34' milled back beyond the normal diametrical dividing line to provide a space 60 between them. To each face 33'—34' is secured a resilient pad 63—64 respectively. Such pads 63—64 are provided on each split side of the half spheres 33—34 so as to form a sealing gasket at the otherwise open sides of the ball grip. In this manner the interior of the valve 20 is protected against grit which might enter and get between the internal parts which are movable relative to each other. In this connection the flanges 43—53 of retaining nuts 39—49, respectively, also cooperate with the respective cut in faces 40'—50' to effectively seal the ends of the split ball grip.

These pads 63—64 preferably consist of soft sponge rubber secured to the respective surfaces 33'—34' by any suitable adhesive such as plastic cement. These sponge rubber pads bear against each other with sufficient compression to assure a sealing action therebetween. It is therefore apparent that these resilient pads, in addition to providing a seal, tend to urge the half ball members 33—34 apart. Consequently, they serve as pressure resisting means at the periphery of the ball grip and thereby assist the resilient latex tube 22 in maintaining the ball halves in spread apart relation when the locking flange 53 is withdrawn from the keeper groove 56. Since the resilient quality of each set of pads 63—64 on diametrically opposite sides of the barrel 22 is substantially equal, they counterbalance each other in urging the ball halves apart with equal pressure. In this manner any binding between the relatively movable internal parts of the valve is minimized.

The valve 20 in accordance with the foregoing construction provides a smooth, positive acting mechanism capable of being operated advantageously within a skillful hand. A sandblast artist holding the ball grip valve 20 in his left hand while manipulating the nozzle 17 with his right hand, can skillfully control the flow of sand-air mixture in the hose line 16. That is to say, by squeezing the ball halves together the passage 23 in the hose insert 22 can be restricted and varied by the disposition of the pins 29—30. Thus the stream flowing from the nozzle 17 can be changed in degree to effect coarse or light cutting action upon the object receiving the blast. The flow to the nozzle can be completely stopped by full pressure upon the ball halves. If the workman wants to shut off the flow momentarily, in order to change the position of the object being worked upon or during movement of the nozzle to another object, the locking nut 49 is turned with his free hand while he grips the ball halves with the other hand. Thus the locking flange 53 and keeper groove 56 interlock to maintain the pins 29—30 in complete pinching relation against the latex tube 22.

While I have described the construction of my improved valve in specific detail it will be apparent that certain variations, modifications and alterations may be made in it without departing from the spirit of my invention. I, therefore, desire to avail myself of all variations, modifications and alterations as fairly fall within the purview of the appended claims.

What I claim as new and desire to protect by Letters Patent is:

1. A valve for mounting in an air blast line comprising an open ended barrel having diametrically opposed axially aligned passages between its ends, a tubular collapsible rubber hose disposed within said barrel, means for connecting an end of said hose to an air blast line, a pin in each of said passages with its inner end disposed to bear against said hose section for collapsing the same, shiftable hand grip members mounted on said barrel each engageable by the outer end of one of said pins for urging the latter toward the axis of said barrel to thereby crimp or pinch said hose to restrict and stop the flow of air blast therethrough, inner and outer flanges formed on each shiftable member, and retaining means threadedly mounted on the ends of said barrel and having an annular flange cooperating with said inner and outer flanges on said shiftable members for limiting inward and outward movement of the latter relative to each other.

2. A valve for mounting in an air blast line comprising an open ended barrel having diametrically opposed axially aligned passages between its ends, a tubular collapsible rubber hose disposed within said barrel, a pin in each of said passages with its inner end disposed to bear against said hose section for collapsing the same, shiftable members mounted on opposite sides of said barrel and each engageable by the outer end of one of said pins for urging the latter toward the axis of said barrel to thereby crimp or pinch said hose to restrict and stop the flow of air blast therethrough, inner and outer flanges formed on each shiftable member adjacent the ends of said barrel, and retaining means threadedly mounted on the ends of said barrel and having an annular flange cooperating with said inner and outer flanges on said shaftable members for limiting inward and outward movement of the latter relative to each other, said shiftable members having an annular keeper groove formed therein adjacent the outer flange thereon adapted to receive the annular flange on one of said retaining means for locking said shiftable members in a fixed position relative to each other.

3. A valve for mounting in an air blast line comprising an open ended barrel having diametrically opposed axially aligned guide passages between its ends, an elastic tubular hose within said barrel, means for connecting an end of said hose to an air blast line, a pin in each of said guide passages with its inner end engaging said tubular hose and its outer end extending beyond the periphery of said barrel, a hemispherical gripping means mounted on each of said pins and said barrel said gripping means being constructed and arranged to be pressed together for urging said pins toward each other to thereby pinch said tubular hose, each hemispherical gripping means having a chordal face adjacent each open end of said barrel provided with inner and outer flanges disposed for concentric alignment with the axis of said barrel, and retaining means on each end of said barrel each having an annular flange disposed between the inner and outer flanges on the adjacent chordal face of said hemispherical gripping means for limiting inward and outward movement of said gripping means relative to each other.

4. A valve for mounting in an air blast line comprising an open ended barrel having diametrically opposed axially aligned guide passages between its ends, an elastic tubular hose within said barrel, means for connecting an end of said hose to an air blast line, a pin in each of said guide passages with its inner end engaging said tubular hose and its outer end extending beyond the periphery of said barrel, a hemispherical gripping means mounted on each of said pins and said barrel, said gripping means being constructed and arranged to be pressed together for urging said pins toward each other to thereby pinch said tubular hose, each hemispherical gripping means having a chordal face adjacent each open end of said barrel provided with inner and outer flanges disposed for concentric alignment with the axis of said barrel, and retaining means on each end of said barrel each having an annular flange disposed between the inner and outer flanges on the adjacent chordal face of said hemispherical gripping means for limiting inward and outward movement of said gripping means relative to each other, one chordal face on each gripping means having a keeper groove formed therein adapted to receive the annular flange of the adjacent retaining means for locking said gripping means in pressed together position.

5. A valve for controlling an air blast line comprising an open ended barrel having diametrically opposed axially aligned guide passages between its ends, an elastic tubular hose within said barrel, means for connecting an end of said hose to an air blast line, a pin in each of said guide passages with its inner end engaging said tubular hose and its outer end extending beyond the periphery of said barrel, a hemispherical gripping means mounted on each of said pins and said barrel, said gripping means being constructed and arranged to be pressed together for urging said pins toward each other to thereby pinch said tubular hose, each hemispherical gripping means having a chordal face adjacent an open end of said barrel, inner and outer flanges disposed on each of said chordal faces for concentric alignment with the axis of said barrel, and retaining means on an end of said barrel and comprising an annular flange disposed between the inner and outer flanges on the chordal faces of said hemispherical gripping means for limiting inward and outward movement of said gripping means relative to each other, said chordal face on each gripping means having a keeper groove formed therein adjacent its outer flange adapted to receive the annular flange of the retaining means for locking said gripping means in pressed together position.

6. A valve for controlling an air blast line comprising an open ended barrel having an outwardly extending annular flange between its end provided with diametrically opposed axially aligned passages, a tubular collapsible rubber hose disposed within said barrel, means for connecting said hose to an air blast line, a pin in each of said passages with its inner end disposed to bear against said hose section for collapsing the same, the outer end of each pin extending beyond the periphery of the annular flange on said barrel, a shiftable member mounted on each of said pins and guided for sliding movement on said annular flange for urging said pins toward the axis of said barrel to thereby pinch said hose to restrict and stop the flow of blast of air therethrough, inner and outer flanges formed on said shiftable members adjacent an end of said barrel, and retaining means threadedly mounted on the ends of said barrel and having an annular flange cooperating with said inner and outer flanges on said shiftable members for limiting inward and outward movement of the latter relative to each other.

7. A valve for controlling an air blast line comprising an open ended barrel having an outwardly extending annular flange between its ends provided with diametrically opposed axially aligned passages, a tubular collapsible rubber hose disposed within said barrel, means for connecting an end of said hose to an air blast line, a pin in each of said passages with its inner end disposed to bear against said hose section for collapsing the same, the outer end of each pin extending beyond the periphery of the annular flange on said barrel, a shiftable member mounted on each of said pins and guided for sliding movement on said annular flange for urging said pins toward the axis of said barrel to thereby pinch said hose to restrict and stop the flow of blast air therethrough, said shiftable members having inner and outer flanges formed thereon adjacent the ends of said barrel, and retaining means threadedly mounted on the ends of said barrel and having an annular flange cooperating with said inner and outer flanges on said shiftable members for limting inward and outward movement of the latter relative to each other, said shiftable members having an annular keeper groove formed therein adjacent the outer flange thereon adapted to receive the annular flange on one of said retaining means for locking said shiftable members in a fixed position relative to each other.

8. A valve for controlling an air blast line comprising an open ended barrel having an outwardly extending annular flange between its ends provided with diametrically opposed axially aligned passages, a tubular collapsible rubber hose disposed within said barrel, a pin in each of said passages with its inner end disposed to bear against said hose section for collapsing the same, the outer end of each pin extending beyond the periphery of the annular flange on said barrel, a hemispherical gripping member mounted on each of said pins and guided for sliding movement on said annular flange for urging said pins toward the axis of said barrel, resilient pads disposed between said hemispherical gripping members on diametrically opposite sides of said barrel for yieldingly maintaining said hemispherical gripping members in spaced apart position, each said hemispherical gripping member having a chordal face adjacent each open end of said barrel provided with inner and outer flanges disposed for concentric alignment with the axis of said barrel, and retaining means threadedly mounted on the ends of said barrel and having an annular flange cooperating with said inner and outer flanges on said hemispherical gripping members for limiting inward and outward movement of the latter relative to each other.

9. A valve for controlling an air blast line comprising an open ended barrel having an outwardly extending annular flange between its ends provided with diametrically opposed axially aligned passages, a tubular collapsible rubber hose disposed within said barrel, a pin in each of said passages with its inner end disposed to bear against said hose section for collapsing the same, the outer end of each pin extending beyond the periphery of the annular flange on said barrel, a hemispherical gripping member mounted on each of said pins and guided for sliding movement on said annular flange for urging said pins toward the axis of said barrel, resilient pads disposed between said hemispherical gripping members on diametrically opposite sides of said barrel for yieldingly maintaining said hemispherical gripping members in spaced apart position, each said hemispherical gripping member having a chordal face adjacent each open end of said barrel provided with inner and outer flanges disposed for concentric alignment with the axis of said barrel, and retaining means threadedly mounted on the ends of said barrel and having an annular flange cooperating with said inner and outer flanges on said hemispherical gripping members for limiting inward and outward movement of the latter relative to each other, one chordal face on each hemispherical gripping member having a keeper groove formed therein adjacent its outer flange so as to receive the annular flange of the adjacent retaining means for locking said hemispherical gripping members together against the action of said resilient pads.

References Cited in the file of this patent

UNITED STATES PATENTS

| Number | Name | Date |
| --- | --- | --- |
| 177,478 | Curtis | May 16, 1876 |
| 307,871 | Richtmann | Nov. 11, 1884 |
| 787,591 | Sonnenfeld | Apr. 18, 1905 |
| 904,329 | Hohman | Nov. 17, 1908 |
| 967,772 | Hohman | Aug. 16, 1910 |
| 1,171,286 | Wadsworth | Feb. 8, 1916 |
| 1,746,603 | Paradis | Feb. 11, 1930 |
| 1,865,012 | Jackson | June 28, 1932 |
| 2,197,995 | Crowley | Apr. 23, 1940 |
| 2,371,434 | Eppler | Mar. 13, 1945 |